(12) United States Patent
Rangwalla et al.

(10) Patent No.: US 6,436,498 B1
(45) Date of Patent: Aug. 20, 2002

(54) REACTIVE SILICONE/ALKYLENEIMINE BARRIER LAMINATING ADHESIVES HAVING BIS-SILANE ADDITIVES

(75) Inventors: Imtiaz J. Rangwalla, Andover, MA (US); John E. Wyman, Sanibel, FL (US); Patrick Jacques Jean Merlin, Neufvilles (BE); Shrenik Mahesh Nanavati, Midland; Lisa Marie Seibel, Dexter, both of MI (US); Laurence Gallez, Erbisoeul (BE)

(73) Assignees: Dow Corning Corporation, Midland, MI (US); Dow Corning SA, Seneffe (BE); EG Technology Partners, L.P., Wilmington, MA (US)

( * ) Notice: Subject to any disclaimer, the term of this patent is extended or adjusted under 35 U.S.C. 154(b) by 0 days.

(21) Appl. No.: 09/518,576

(22) Filed: Mar. 3, 2000

(51) Int. Cl.$^7$ .......................... B32B 27/08; B32B 27/16; B32B 27/32; B32B 27/36; B32B 31/12
(52) U.S. Cl. .................... 428/35.7; 428/34.1; 428/35.2; 428/36.9; 428/446; 428/447; 428/448; 428/449; 428/451; 428/457; 428/458; 428/461; 428/474.4; 428/480; 428/483; 428/492; 428/515; 428/516; 428/523; 156/272.2; 156/275.5; 156/297; 156/299; 156/307.1; 156/329; 156/330.9; 156/331.1; 156/331.8
(58) Field of Search ................................. 428/446, 447, 428/448, 449, 425.5, 451, 457, 458, 461, 469, 474.4, 480, 483, 515, 516, 523, 34.1, 35.2, 35.7, 36.9; 156/272.2, 275.5, 297, 299, 329, 330.9, 331.1, 331.8, 305, 307.1

(56) References Cited

U.S. PATENT DOCUMENTS

| | | | | |
|---|---|---|---|---|
| 2,832,754 A | | 4/1958 | Kenmore et al. ........... 260/45.5 |
| 2,920,095 A | | 1/1960 | Jex et al. .................. 260/448.8 |
| 3,445,326 A | * | 5/1969 | Hurst .......................... 161/207 |
| 3,477,901 A | * | 11/1969 | Keil ............................ 161/208 |
| 4,045,460 A | * | 8/1977 | Kleinstuck ........... 260/448.8 R |
| 4,761,435 A | | 8/1988 | Murphy et al. ................ 522/46 |
| 4,943,600 A | | 7/1990 | Noren et al. ................ 522/106 |
| 5,017,406 A | | 5/1991 | Lutz et al. .................. 427/54.1 |
| 5,101,055 A | | 3/1992 | Dinh et al. .................. 556/413 |
| 5,212,017 A | * | 5/1993 | Meder ......................... 428/447 |
| 5,948,927 A | * | 9/1999 | Gunther et al. ............. 556/419 |
| 6,023,607 A1 | * | 3/2001 | Schoonderwoerd et al. ..... 106/287.11 |

FOREIGN PATENT DOCUMENTS

| | | | |
|---|---|---|---|
| JP | 07-018221 | 1/1995 | |
| WO | WO 98/31539 | 7/1998 | ............. B32B/7/08 |
| WO | WO 98/31541 | 7/1998 | ........... B32B/27/08 |

* cited by examiner

*Primary Examiner*—Vivian Chen
(74) *Attorney, Agent, or Firm*—Jim L. De Cesare; Alan Zombeck

(57) ABSTRACT

A method of laminating two substrates by coating at least one side of a substrate with a laminating adhesive, bringing a coated side of the substrate into contact with a second substrate to form a three layer film, and treating the three layer film with a free radical initiator. The laminating adhesive is formed by mixing an ethylenically unsaturated acid, a bis-silane and a polyamine, and the polyamine optionally can have a crosslinker reacted therein.

40 Claims, No Drawings

REACTIVE SILICONE/ALKYLENEIMINE BARRIER LAMINATING ADHESIVES HAVING BIS-SILANE ADDITIVES

FIELD OF THE INVENTION

The invention relates to polyamine containing coatings having both barrier and adhesive properties which are useful in packaging applications.

BACKGROUND OF THE INVENTION

It is well known that coatings containing polyamine compounds and itaconic acid improve the gas, oil, and flavor barrier performance of organic polymer film substrates, i.e., see for example PCT/BE98/00007, the US equivalent of which is U.S. Ser. No. 09/341,254 which was filed on Jul. 15, 1999. Moreover, the adhesion of the coating to the film surface, as well as the improved barrier characteristics provided by the silane coating, are greatly enhanced by exposing the coated film to electron beam radiation.

These coatings represent a significant advance in the art. However, it has been observed that while the barrier properties of the prior art coatings are excellent in environments at relative humidities of 80% or less, their performance suffers significantly at relative humidities of 90% or more.

The present inventors have surprisingly discovered that the combination of a polyamine, an ethylenically unsaturated acid, and a bis-silane gives excellent gas barrier properties at low to moderate relative humidity values, as well as excellent gas barrier properties at very high relative humidity values of 90% or more and improved resistance to water. The key improvement is the addition of a bis-silane, which results in excellent barrier at humidities of greater than 90%. The composition may be crosslinked to further improve barrier. As used herein, the term "barrier" means improving to at least 90 cc/m$^2$/day a 12 µm uncoated biaxially oriented, corona treated polyethylene terephthalate (PET) film, having a permeability measured at 0% relative humidity to oxygen of 144 cc/M$^2$/day and a permeability measured at 90% relative humidity to oxygen of 123 cc/M$^2$/day as measured at ASTM D3985-81.

None of the prior art teaches the present invention. For example, U.S. Pat. No. 4,761,435 claims UV curable polyethylenically unsaturated compositions in combination with a polyamine resin, which use an aryl ketone photosensitizer. The '435 patent teaches that acid functionality in the compositions is undesirable (col. 5, line 24). The patentees indicate that the formation of amine salts is to be avoided, because the photosensitizer reacts only with an amine, and not an amine salt. This is in contrast to the present invention, which teaches that the formation of acid salts is desirable and results in superior barrier properties.

Another example, U.S. Pat. No. 4,943,600, teaches the combination of a tertiary amine containing resin, allyl terminated resin, and a maleate functional resin. Likewise the patentee teaches that the compositions are formulated to minimize or eliminate carboxyl functionality, which contrasts directly with the present invention.

U.S. Pat. No. 5,017,406 claims UV curable compositions which contain reactive unsaturated compounds, but does not teach the use of a polyamine or an unsaturated acid as does the present invention.

JP (Kokai) publication 7-18221 published on Jan. 20, 1995 teaches a surface treatment composition for gas barrier comprising an aminosilane and a compound having an aromatic ring or hydrogenated ring. The present invention is distinguishable, however, because it does not require the addition of cyclic compounds having an aromatic ring, nor does the reference teach the addition of an ethylenically unsaturated acid.

The present invention is distinguishable from the prior art because none teach the use of a polyamine, a bis-silane and an ethylenically unsaturated acid to achieve gas barrier properties and adhesive characteristics.

SUMMARY OF THE INVENTION

The present invention relates to a method of laminating two substrates by coating at least one side of a substrate with a laminating adhesive, bringing a coated side of said substrate into contact with a second substrate to form a three layer film, and treating said three layer film with a free radical initiator, wherein said laminating adhesive is formed by mixing an ethylenically unsaturated acid, a bis-silane and a polyamine, wherein said polyamine optionally has a crosslinker reacted therein, and wherein said polyamine has four or more A, B, or C units, where:

A is an —R$^2$—N(R$_1$)$_2$ unit, B is an —R$^1$—N(R$^2$—)$_2$ unit, and C is an (—R$^2$)$_3$N—unit, where
R$^1$ is independently selected from hydrogen, alkyl, substituted alkyl, aryl, substituted aryl, arylalkyl, and alkylaryl, and
R$^2$ is independently selected from the group consisting of linear or branched alkylene groups or substituted alkylene groups having from 1 to 18 carbon atoms, and arylene groups or substituted arylene groups having from 6 to 18 carbon atoms.

The invention can be used to laminate a variety of substrates for use in packaging applications.

DESCRIPTION OF THE PREFERRED EMBODIMENTS

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

Polyamines

The polyamines of the present invention are polymeric, either homopolymeric or copolymeric polyamines having four or more A, B, or C units, where:

A is an —R$^2$—N(R$^1$)$_2$ unit, B is an —R$^1$—N(R$^2$—)$_2$ unit, and C is an (—R$^2$)$_3$N—unit, where
R$^1$ is independently selected from hydrogen, alkyl, substituted alkyl, aryl, substituted aryl, arylalkyl, and alkylaryl, and
R$^2$ is independently selected from the group consisting of linear or branched alkylene groups or substituted alkylene groups having from 1 to 18 carbon atoms, and arylene groups or substituted arylene groups having from 6 to 18 carbon atoms.

R$^1$ is independently selected from hydrogen, alkyl, substituted alkyl, aryl, substituted aryl, arylalkyl, alkylaryl, and R$^2$ is independently selected from the group consisting of linear or branched alkylene groups or substituted alkylene groups having from 1 to 18 carbon atoms and arylene groups or substituted arylene groups having 6 to 18 carbon atoms. For example, $R^1$ or $R^2$ can be substituted with hydroxyl groups.

The amines of the present invention are polymeric in nature, preferably having molecular weights of from about 150 to about 2,000,000, with about 400 to about 400,000 preferred, and most preferred being from about 600 to about 80,000. The high degree of polymerization of the amine provides a lower degree of tackiness in the final composition. The lower molecular weight polyamines can be further polymerized to form higher molecular weight polyamines by methods well known in the art, such as by reaction with dialkyl halides (i.e. ethylene dichloride), diisocynates (e.g. tolydiisocyanate, hexamethylene diisocyanate), di(meth) acrylate esters (e.g. hexanediol diacrylate pentaerythritol diacrylate), diepoxides (ethylene glycol diglycidyl ether).

Examples of polyamines useful for the invention include polyvinyl amines, aminofunctional polyacrylamides, poly-DADMAC's, i.e., polydiallyl dimethyl ammonium chloride, polyvinyl pyrrolidene copolymers, polyethylene imine and the reaction product of ethylenediamine and epichlorohydic copolymers.

A preferred polyamine that can be used to achieve varying degrees of tackiness is the class of polyamines referred to as polyalkylene imines, such as polyethylene imine, which is readily available in a wide range of molecular weights and different degrees of branching. Polyethylene imines consist of a large family of water-soluble, i.e. hydrophilic, polyamines of varying molecular weight and degree of chemical modification. It is generally known that the polymerization of ethyleneimine does not result in a polymer that is completely composed of units having a linear structure, but that also the degree of branching in polyethylene imine depends on the acid concentration and the temperature during polymerization. This degree of branching may, for example, vary between 12 and 38 percent. The formula of polyethylene imine can be represented in the form of A, B, or C units, where:

A is an —$R^2$—N($R_1$)$_2$ unit, B is an —$R^1$—N($R^2$—)$_2$ unit, and C is an (—$R^2$)$_3$N—unit, where $R^1$ is hydrogen $R^2$ is an —$CH_2CH_2$— group. The ratio of A to B to C units can be from about 1:0.5:0.5 to about 1:2:1, but is preferably from about 1:1:1 to about 1:2:1.

Additional groups may be grafted onto polyethylene imines using methods well known in the art, to change the affinity of the coating to the substrate, or the adhesive properties. Examples of polyethylene imine modification include reaction with ethylene oxide structures (ethylene oxide, glycidol) to introduce hydroxyl groups, reaction with cyanide and aldehydes followed by hydrolysis to introduce carboxylic acid groups ("Strecke Synthesis"), grafting of phosphoric acid or sulfonic acid groups, and grafting of lipophilic alkyl chains using alkylating agents such as dimethyl sulfate.

Preferred molecular weights of the polyethylene imine are from about 600 to about 80,000. Most preferred molecular weights of the polyethylene imine are from about 600 to about 25,000.

Typical polyethylene imines are SZ-6050, a silane grafted polyethylene imine available from Dow Corning Toray Silicone (Japan), and SP-103 and SP-110 which are 600 and 1000 molecular weight polyethylene imines available from Nippon Shokubai, (Japan).

Ethylenically Unsaturated Acid

A predetermined quantity of an ethylenically unsaturated acid is also added to the composition. By "ethylenically unsaturated acid" it is meant any acid which has vinyl unsaturation. The ethylenically unsaturated acid is likely to be added in the amount of up to about 80 parts by weight of the composition, with about 5 to about 75 parts by weight being most preferred. The most preferred ethylenically unsaturated acid for use in the present invention is itaconic acid; however, other acids such as fumaric, maleic, citraconic, acrylic, methacrylic, cinnamic, itaconic acid monomethylester, vinylphosphonic acid, sorbic acid, mesaconic acid, and vinyl sulphonic acid may be used as well. The term "ethylenically unsaturated acid" as used herein is meant to include mixtures of one or more of the aforementioned acids. Preferably, the molar ratio of gram atoms of nitrogen in the polyamine to acid groups on the acid is from about 10:1 to about 1:100, with about 5:1 to about 1:10 being preferred and about 2:1 to about 1:4 being most preferred. In fact, the acid can be added to the solubility limit of the ethylenically unsaturated acid, which is typically reached in amounts of up to about 80 parts by weight of the composition.

Bis-silanes

The key additive of the present invention is a bis-silane described by the general formula

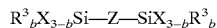

wherein Z is $R^4NH(R^4NH)_pR^4$.

In this formula each R is preferably a hydrocarbon group having 1 to 10 carbon atoms, for example a saturated or unsaturated aliphatic or aromatic group, for example alkyl, alkenyl, or phenyl groups; preferred groups are methyl and ethyl, the most preferred of which are methyl groups. Each X is an alkoxy group with 1 to 4 carbon atoms, a halogen atom, an oxime group or an acyloxy group, of these methoxy and ethoxy groups are preferred, the most preferred being methoxy groups. $R^4$ may be a divalent hydrocarbon group having 1 to 12 carbon atoms, preferably each $R^4$ has from 2 to 3 carbon atoms. Each b is from 0 to 3 but is most preferably 0, and p is 0 or 1. The best results are obtained by use of compounds in which each X is a methoxy group, each $R^4$ is a methylene group, b is 0, and p is 0, i.e. when the compound is bis-(gamma-trimethoxysilylpropyl)amine.

These materials may be referred to as disilylated secondary amines used in the present invention may be prepared by processes known in the art for example, as disclosed in U.S. Pat. Nos. 2,832,754, 2,920,095 and 5,101,055.

Solvents

The components of the present invention can optionally be combined in the presence a solvent. In general, water, alcohols and blends thereof will serve as suitable solvents because the polyamine and the ethylenically unsaturated acid are soluble therein. Another highly preferred class of solvents are ether derivatives of mono or polyglycols, such as mono or polyalkylene oxides, which includes solvents like ethylene glycol dimethyl ether. In addition, the selected solvent will preferably wet the substrate. Preferably, the solvent should be non-toxic, and will not extend the drying time of the coating beyond what is commercially acceptable. The amount of solvent can range from about 20% to about 99% and is preferably from about 60 to about 95 parts by weight of the composition. Preferred solvents are methanol, ethanol, n-propanol, isopropanol, butanol, and 1-methoxy 2-propanol (available as "Dowanol PM" from The Dow Chemical Company, Midland, Mich.).

Optional Crosslinkers

While the polyamine, the ethylenically unsaturated acid and the bis-silane may be combined to form the compositions of the present invention, it is highly preferred that a crosslinker is added to improve the barrier properties, reduce dewetting, and improve appearance. It is believed that a higher crosslink density results in these improved properties. As used herein the term "crosslinker" is defined to mean an agent which can further chain extend and/or crosslink the polyamine. The crosslinker may be an organic crosslinker or more preferably, a reactive silane crosslinker, or mixtures thereof.

Organic Crosslinkers

While the polyamine, the ethylenically unsaturated acid and the bis-silane may be combined to form the compositions of the present invention, it is preferred that a compound be added that will further chain extend and crosslink the polyamine chain. It is believed that a higher degree of polymerization and crosslinking of the polyamine is desirable to provide improved barrier properties and appearance of the barrier coatings of the present invention. The compounds useful to chain extend and crosslink the polyamine chain include, but are not limited to, multifunctional acrylates, methacrylates, epoxides, isocyanates, thiocyanates, acid halides, quinones, acid anhydrides, esters, alkyl halides, aldehydes or combinations thereof. Specific examples include, but are not limited to hexanediol diacrylate, glycidyl methacrylate, ethyleneglycol diglycidyl ether, tolyl diisocyanate, ortho and para benzoquinones.

The polyamine can be chain extended and crosslinked either prior to or subsequent to coating the composition on a substrate. Compounds useful to chain extend and crosslink the polyamine coating include those materials which will undergo an acid catalyzed condensation reaction with the nitrogen atom of the polyamine, such as tris-methylol phenol, aldehydes such as formaldehyde and glyoxal, and mixtures of formaldehyde and active methylene compounds that will undergo a Mannich reaction.

The ethylenically unsaturated acid can be crosslinked independently of the polyamine by the addition of multifunctional compounds which will copolymerize with the ethylenically unsaturated acid. These compounds include multifunctional acrylates and methacrylates. In addition, the ethylenically unsaturated acid may be crosslinked directly into the crosslinked polyamine structure by the addition of acrylate and methacrylate functional silane. The acrylate and methacrylate functional silane compounds such as acryloxypropyltrimethoxysilane and methacryloxypropyltrimethoxysilane may be added to the compositions of this invention prior to or subsequent to the ethylenically unsaturated acid to crosslink the polyacid. Hydrolysis and condensation of the alkoxy or acyloxy groups subsequent to coating will form a polymeric material with multi functional groups which will copolymerize with the ethylenically unsaturated acid.

The organic crosslinkers are preferably added in a polyamine/organic crosslinker ratio of about 100:1 to about 1:10, with a preferred ratio being about 10:1 to about 1:1 and most preferred ratio being about 5:1 to about 2:1.

Reactive Silane Crosslinker

The most preferred compounds are those which contain both a functional group that will react with a nitrogen atom on the polyamine chain prior to addition of the ethylenically unsaturated acid to the compositions of this invention, as well as a trialkoxy or triacyloxy silane group which will undergo hydrolysis and condensation reaction subsequent to coating the composition of the present invention utilizing an optional solvent containing water.

Because the silane portion of the molecule is terminated with hydroxyl or alkoxy groups, it can condense with the hydroxy or alkoxy portion of other silicone terminated molecules to form Si—O—Si groups. The Si—O—Si bonds increase the crosslink density of the composition. The reactive silane can have the general formula $QSiR_m(OR)_{3-m}$, where Q is any group containing one or more acrylates, aldehydes, methacrylates, acrylamides, methacrylamides, isocyanates, isothiocyanates, anhydrides, epoxides, acid chlorides, linear or branched halogenated alkyl, and halogenated aryl, and m is 0, 1, or 2, and R is a group having from 1 to 4 carbon atoms. Specifically, the reactive silane includes molecules such as gamma-acryloxypropyltrimethoxysilane, gamma-methacryloxypropyltrimethoxysilane, 3-glycidoxypropyltrimethoxysilane, chloropropyltrimethoxysilane, chloropropyltriethoxysilane, gamma-isocyanatopropyltriethoxysilane, vinyltriethoxysilane, vinyltrimethoxysilane, vinyl-tris-(2-expoxycyclohexyl)silane, ethyltrimethoxysilane, chloropropyltriethoxysilane, chloropropylethyldimethoxysilane, methyldimethoxysilane and glycidoxypropylmethyldimethoxysilane. The most preferred reactive silanes are chloropropyltrimethoxysilane available from the Dow Corning Corporation as SZ-6076, chloropropyltriethoxysilane available from the Dow Corning Corporation as SZ-6376 and gamma-trimethoxysilylpropyl glycidyl ether, available from the Dow Corning Corporation as Z-6040. It may be necessary to neutralize the polyamine after the reaction of the crosslinker therein, such as by adding sodium methoxide and filtering off the resulting precipitate.

The reactive silanes are preferably added in a polyamine/reactive silane weight ration of about 100:1 to about 1:10, with a preferred ratio being 10:1 to 1:1 and most preferred ratio being about 5:1 to about 2:1.

Coating Thickness

The coating can be applied in any desired amount, however, it is preferred that the coating be applied in an amount such that the coat weight is up to about 20 $\mu$m thickness, the most preferred coating thickness being from about 0.5 to about 10 $\mu$m. Coating thickness can be determined by Scanning Electron Microscopy (SEM) analysis. The coating can be applied to the substrate by any conventional method, such as spray coating, roll coating, slot coating, meniscus coating, immersion coating, and direct, offset, and reverse gravure coating.

Substrates

The coating can be disposed on a wide variety of substrates, including, but not limited to polyolefins, such as oriented polypropylene (OPP), cast polypropylene, polyethylene and polyethylene copolymers, polystyrene, polyesters, such as polyethylene terephthalate (PET), or polyethylene naphthalate (PEN), polyolefin copolymers, such as ethylene vinyl acetate, ethylene acrylic acid and ethylene vinyl alcohol (EVOH), polyvinyl alcohol and copolymers thereof, polyamides such as nylon and meta-xylene adipamide (MXD6), polyimides, polyacrylonitrile, polyvinyl chloride, polyvinylidene dichloride, and polyacrylates, ionomers, polysaccharides, such as regenerated cellulose, and silicone, such as rubbers or sealants, other natural or synthetic rubbers, glassine or clay coated paper, paper board or craft paper, and metallized polymer films and vapor deposited metal oxide coated polymer films, such as $AlO_x$, $SiO_x$, or $TiO_x$.

The aforesaid substrates are likely to be in the form of a film or sheet, though this is not obligatory. The substrate may be a copolymer, a laminate, a coextrudate, a blend, a coating or a combination of any of the substrates listed above according to the compatibility of the materials with each other. In addition, the substrate may be in the form of a rigid container made from materials such as polyethylene, polypropylene, polystyrene, polyamides, PET, EVOH, or laminates containing such materials.

The aforesaid substrates may also be pretreated prior to coating by corona treatment, plasma treatment, acid treatments and flame treatments, all of which are known in the art.

In addition, the compositions of the present invention can be used as barrier layers on a wide variety of packaging containers, such as pouches, tubes, bottles, vials, bag-in-boxes, stand-up pouches, gable top cartons, thermo-formed trays, brick-packs, boxes, cigarette packs and the like.

Of course, the present invention is not limited to just packaging applications, and may be used in any application wherein gas, or aroma barrier properties are desired, such as tires, buoyancy aides, inflatable devices generally, etc.

Any of the foregoing substrates may have primers applied thereon. The primers are applied to the substrates by methods known in the art such as spray coating, roll coating, slot coating, meniscus coating, immersion coating, and direct, offset and reverse gravure coating. Suitable primers include, but are not limited to carbodiimide, polyethylene imine, and silanes, such as N-(2-aminoethyl)-3-aminopropyltrimethoxysilane and aminopropyltriethoxysilane.

The most preferred laminate structures are (where Co represents the coating composition of this invention), OPP/Co/OPP, OPP/Co/PE, metOPP/Co/OPP, metOPP/Co/PET, metal oxide coated PET/Co/PE, metal oxide coated OPP/Co/PE, metal oxide coated PET/Co/PP, metal oxide coated OPP/Co/PP, and PE/Co/PE.

Curing

The laminates are preferably cured by a free radical generator, such as ultraviolet, electron beam, or gamma radiation or chemical free radical generators such as azo compounds and peroxides. Low energy electron beam is the preferred method of curing because it is cheaper than gamma sources like Cobalt M-60. Its advantage over ultraviolet radiation as a cure system lies in its ability to generate free radicals without photoinitiators. It also imparts higher yields of crosslink density and chemical grafting of the coating to the substrate. Electron beam accelerators of various types such as van de Graaf-type, resonance transformer-type, linear-type, dynamatron-type and high frequency-type can be used as a source of electron beam. Electron beams having energy of from about 5 to about 2000 KeV, preferably from about 50 to about 300 KeV discharged therefrom may be irradiated in a dose of from about 0.1 to about 10 Mrads (Mr). A most preferred dosage is about 150 KeV of at least 5 Mr. Low electron beam voltages may be used if the substrate is treated in a vacuum. Commercially available sources of electron beam are Electrocure CB-150 available from Energy Sciences, Inc. (Wilmington, Mass.).

The laminates may also be ultraviolet light cured if one or more photoinitiators is added prior to curing. There are no special restrictions on the photoinitiators as long as they can generate radicals by the absorption of optical energy. Ultraviolet light sensitive photoinitiators or blends of initiators used in the UV cure of the present composition include 2-hydroxy-2-methyl-1-phenyl-propan-1-one (Darocure 1173), sold by EM Chemicals, and 2,2 Dimethoxy-2-phenyl-acetol-phenone (Irgacure 651), sold by Ciba-Geigy Corporation, Hawthorne, N.Y. For purposes of this invention, it has been found that from about 0.05 to about 5 weight percent based on the total solids in the composition, of the photoinitiators described therein will cause the composition to cure.

Other types of free radical generators, known to those skilled in the art may also be employed, such as promoted peroxides, azo compounds, etc.

In addition, other methods of curing may be required if a crosslinker is added to the composition. For example if a reactive silane crosslinker is added, the composition may be cured via a condensation reaction, which requires the presence of moisture. The moisture may be present in the coating solution itself, or may be added through steam or in a high humidity oven. The reaction may be accelerated though the presence of heat, for example, by heating in an oven at temperatures up to about 140° C., with temperatures of from about 60° C. to about 120° C. being preferred and temperatures of about 90° C. to about 110° C. being most preferred. Heating time is temperature dependent and the coating will reach tack free time in one to 10 seconds. The heating step serves to evaporate the solvent, and accelerate the condensation reaction between silanol groups. The additional cure chemistries required will depend on the particular crosslinking systems employed, which are well known in the art.

The key factor in determining whether a particular formulation is acceptable as a laminate adhesive is whether the composition exhibits a minimum degree of tackiness. If the laminate adhesive is at least minimally tacky, then it will fall within the scope of the invention. The tackiness can be achieve by optimizing the ratios of the components as described above, or by adding a tackifier, such as a multi-functional acrylate.

Preferred Embodiment

N-(isopropoxy, methoxy) silyl propyl polyethylene imine (45% solids in isopropyl alcohol) (344.2 g) and isopropyl alcohol (861 g) were stirred together for 10 mins. Water (2.1 Kg) and itaconic acid (520.6 g) were added to the above mentioned mixture and this was stirred for 15 mins. 1.38 Kg of Part C was added to the mixture and this was stirred for 2 hours (where Part C was made by mixing 1.5 Kg bis-(γ-trimethoxysilylpropyl)amine, 7.4 Kg isopropyl alcohol and 1.1 Kg itaconic acid together). This was coated using a $90^{TH}$ gravure roll operating at 110% of the line speed which was set at 0.31 m/s. After coating, drying, laminating and curing, the permeability was determined to be 0.2 cc dry and 38 cc wet and the adhesive layer thickness was determined to be 1.9 μm.

Optional Additives

Various optional additives can be added to the composition to improve various properties as required. These additives may be added as desired and in any amount as long as they do not degrade the performance of the barrier coatings as illustrated herein. Such additives include antiblock and slip aides, such as stearamide, oleamide or polar additives, such as epoxides, acrylates, methacrylates, polyols, glycidol, glycidyl methacrylate, ethylene glycol diglycidylether, bisphenol A diglycidylether, or polyamines, such as polyethylene imine and other silanes. Wetting agents, such as polyethoxylated phenol may also be added.

EXAMPLES

Experiments 1–6—A1170 Addition to 1-6601/ITA (29:71 wt) Formulation

In experiments 1–6 the (1-6601/A1170):ITA formulations were utilized in a weight ratio of 29:71 with a total solids content of 20%. The solvents employed in all the experiments described below were common industrial grade isopropanol and distilled water. The N-(isopropoxy, methoxy) silyl propyl polyethylene imine (45% solids in isopropyl alcohol) ("1-6601") was obtained from Dow Corning Corporation (Midland, Mich.), the bis-(γ-trimethoxysilylpropyl)amine (Silquest A1170 or "A1170") from Witco and the itaconic acid ("ITA") from Aldrich Chemical Company (Milwaukee, Wis.). The formulation was applied to the primary film web (48 gauge DuPont Mylar LBT2) by means of a reverse gravure cylinder. The solvent was flashed off by passing the web through an oven maintained at 82° C. and the coated film was laminated to the secondary web (200 gauge Huntsman LLDPE 800.14) using a heated laminating nip (70° C., 190PLI). The laminate was next "cured" by an EB machine at 10 Megarads and 115 Kv.

The oxygen permeability values for each film were measured and recorded in units of cc/square meter per 24 hours, "dry" values being measured at 0% relative humidity and "wet" values at 90% relative humidity utilizing MOCON Oxtran 2/20 Series. The MOCON instruments were obtained from Modern Controls Corporation. For comparison, the PET base film had a permeability of about 144 cc/square meter/24 hours when measured at 0% RH and 123 cc/square meter/24 hours when measured at 90% RH. The adhesive layer thickness was measured by means of Scanning Electron Microscopy (SEM). Water resistance of the adhesive layer was measured by rolling up a piece of the laminate (approximately 10 cm×17 cm) and placing in ajar of water with its edge exposed. The laminates were visually inspected periodically for "tunneling" which was characterized by loss of adhesion and separation of the two plastic layers leading to a "bubble type" appearance within the laminate.

Experiment 1—No A1170

Water (2 Kg) was added to a solution of 1-6601 (660 g) and IPA (isopropyl alcohol, 1.68 Kg) and the mixture stirred for 10 minutes. Itaconic acid (712 g) was added to the solution and the mixture was stirred for 2 hours. This was coated using a $90^{TH}$ gravure roll operating at 110% of the line speed which was set at 0.51 m/s. After coating, drying, laminating and curing, the permeability was determined to be 0.1 cc dry and 74 cc wet and the adhesive layer thickness was determined to be 2.2 $\mu$m.

Experiment 2—1% A1170

1-6601 (1.02 Kg) and A1170 (19.2 g) and IPA (2.66 Kg) were stirred together for 10 mins. Water (3.2 Kg) and ITA (1.11 Kg) were added to the above mentioned mixture and this was stirred for 2 hours. This was coated using a $_{90}$TH gravure roll operating at 110% of the line speed which was set at 0.31 m/s. After coating, drying, laminating and curing, the permeability was determined to be 0.25 cc dry and 65 cc wet and the adhesive layer thickness was determined to be 2.5 $\mu$m.

Experiment 3—4% A1170

1-6601 (880 g) and IPA (2.38 Kg) were stirred together for 10 mins. Water (3.2 Kg) and ITA (1.09 Kg) were added to the above mentioned mixture and this was stirred for 15 mins. 428 g of Part A was added to the mixture and this was stirred for 2 hours (where Part A was made by mixing 64.9 g A1170, 320.5 g IPA and 47.65 g ITA together). This was coated using a 90TH gravure roll operating at 110% of the line speed which was set at 0.31 m/s. After coating, drying, laminating and curing, the permeability was determined to be 0.2 cc dry and 59 cc wet and the adhesive layer thickness was determined to be 2.68 $\mu$m.

Experiment 4—10% A1170

1-6601 (680 g) and IPA (2.22 Kg) were stirred together for 10 mins. Water (3.2 Kg) and ITA (1.02 Kg) were added to the above mentioned mixture and this was stirred for 15 mins. 1.07 Kg of Part B was added to the mixture and this was stirred for 2 hours (where Part B was made by mixing 163.6 g A1170, 596.5 g IPA and 124.2 g ITA together). This was coated using a 90TH gravure roll operating at 110% of the line speed which was set at 0.31 m/s. After coating, drying, laminating and curing, the permeability was determined to be 0.1 cc dry and 48 cc wet and the adhesive layer thickness was determined to be 2.9 $\mu$m.

Experiment 5—13% A1170

1-6601 (358.6 g) and IPA (1.16 Kg) were stirred together for 10 mins. Water (2 Kg) and ITA (615.9 g) were added to the above mentioned mixture and this was stirred for 15 mins. 867.1 g of Part C was added to the mixture and this was stirred for 2 hours (where Part C was made by mixing 1.5 Kg A1170, 7.4 Kg IPA and 1.1 Kg ITA together). This was coated using a $90^{TH}$ gravure roll operating at 110% of the line speed which was set at 0.31 m/s. After coating, drying, laminating and curing, the permeability was determined to be 0.1 cc dry and 69 cc wet and the adhesive layer thickness was determined to be 1.8 $\mu$m.

Experiment 6—19% A1170

1-6601 (220 g) and IPA (945 g) were stirred together for 10 mins. Water (2 Kg) and ITA (570.5 g) were added to the above mentioned mixture and this was stirred for 15 mins. 1.27 Kg of Part D was added to the mixture and this was stirred for 2 hours (where Part C was made by mixing 1.5 Kg A1170, 7.4 Kg IPA and 1.1 Kg ITA together). This was coated using a $90^{TH}$ gravure roll operating at 110% of the line speed which was set at 0.31 m/s. After coating, drying, laminating and curing, the permeability was determined to be 1.0 cc dry and 61 cc wet and the adhesive layer thickness was determined to be 2 $\mu$m.

Barrier data and adhesive/water resistance data are shown in Tables 1 and 2 below:

TABLE 1

| Experiment | Material 1-6601:A1170:ITA Ratio | OTR1 90% RH cc/m$^2$/day | OTR 0% RH cc/m$^2$/day | Adhesive Thickness $\mu$m | OTR$_{predicted}$ 2 3 $\mu$m adhesive 90% RH cc/m$^2$/day | OTR$_{predicted}$ 3 3 $\mu$m adhesive 0% RH cc/m$^2$/day |
|---|---|---|---|---|---|---|
| 1 | 29:0:71 | 74 | 0.10 | 2.2 | 64.6 | 0.07 |
| 2 | 28:1:71 | 65 | 0.25 | 2.5 | 59.4 | 0.21 |
| 3 | 25:4:71 | 59 | 0.20 | 2.68 | 55.5 | 0.18 |
| 4 | 19:10:71 | 48 | 0.10 | 2.9 | 47.0 | 0.10 |
| 5 | 16:13:71 | 69 | 0.10 | 1.8 | 53.4 | 0.06 |
| 6 | 10:19:71 | 61 | 1.00 | 2 | 48.7 | 0.67 |

In Table 1, the following abbreviations and meanings have been used, where:

1: OTR is oxygen transmission rate or oxygen gas permeability
2: OTR predicted was calculated by the use of the Generic Composite Permeability Eqt: $Tt/Pt=+Ts/Ps+Tc/Pc$ where T refers to the thickness, in microns, and P to the permeability coefficient of the composite (Tt, Pt), substrate(Ts, Ps), & adhesive (Tc, Pc). The LLDPE substrate was ignored in these calculations because its contribution to barrier properties of the composite is negligible. The substrate PET was measured to be 12 $\mu$m thick and have an OTR of 123 cc/m$^2$/day as measured at 90% RH.
3: same as 2 except that the permeability was measured to be 144 cc/m$^2$/day at 0% RH

TABLE 2

| Expt. # | Material 1-6601: A1170:ITA Ratio | Adhesive Property | Time of observation after start of test min | | | | |
|---|---|---|---|---|---|---|---|
| | | | 45 | 90 | 210 | 1110 | 1260 |
| 1 | 29:0:71 | + | tunneling | — | — | — | — |
| 2 | 28:1:71 | + | good | tunneling | — | — | — |
| 3 | 25:4:71 | + | good | tunneling | — | — | — |
| 4 | 19:10:71 | + | good | good | good | good | good |
| 5 | 16:13:71 | + | good | good | good | good | good |
| 6 | 10:19:71 | + | good | good | good | tunneling | — | was flashed off by passing the web through an oven maintained at 82° C. and the coated film was laminated to the secondary web (200 gauge Huntsman LLDPE 800.14) using a heated laminating nip (71° C., 190PLI). The laminate was next "cured" by an EB machine at 10 Megarads and 115 Kv.

Experiment 7—No A1170

Water (2 Kg) was added to a solution of 1-6601 (776.2 g) and IPA (1.574 Kg) and the mixture stirred for 10 minutes. Itaconic acid (650.2 g) was added to the solution and the mixture was stirred for 2 hours. This was coated using a $90^{TH}$ gravure roll operating at 110% of the line speed which was set at 0.31 m/s. After coating, drying, laminating and curing, the permeability was determined to be 0.5 cc dry and 69.5 cc wet and the adhesive layer thickness was determined to be 1.9 $\mu$m.

Experiment 8—20% A1170

1-6601 (344.2 g) and IPA (861 g) were stirred together for 10 mins. Water (2.1 Kg) and ITA (520.6 g) were added to the above mentioned mixture and this was stirred for 15 mins. 1.38 Kg of Part C was added to the mixture and this was stirred for 2 hours (where Part C was made by mixing 1.5 Kg A1170, 7.4 Kg IPA and 1.1 Kg ITA together). This was coated using a $90^{TH}$ gravure roll operating at 110% of the line speed which was set at 0.31 m/s. After coating, drying, laminating and curing, the permeability was determined to be 0.2 cc dry and 38 cc wet and the adhesive layer thickness was determined to be 1.9 $\mu$m.

Tables 3 and 4 show the barrier data and adhesive/water resistance data, respectively.

TABLE 3

| Expt. # | Material 1-6601:A1170:ITA Ratio | OTR1 90% RH cc/m$^2$/day | OTR 0% RH cc/m$^2$/day | Adhesive Thickness $\mu$m | OTR$_{predicted}$ 2 3 $\mu$m adhesive 90% RH cc/m$^2$/day | OTR$_{predicted}$ 3 3 $\mu$m adhesive 0% RH cc/m$^2$/day |
|---|---|---|---|---|---|---|
| 7 | 35:0:65 | 69.5 | 0.5 | 1.9 | 55.5 | 0.32 |
| 8 | 15:20:65 | 38 | 0.2 | 1.9 | 27.1 | 0.13 |

TABLE 4

| Expt. # | Material 1-6601:A1170:ITA Ratio | Adhesive Property | Time of observation after start of test min | | | | |
|---|---|---|---|---|---|---|---|
| | | | 45 | 90 | 210 | 1110 | 1260 |
| 7 | 35:0:65 | + | good | tunneling | — | — | — |
| 8 | 15:20:65 | + | good | good | good | good | good |

Experiments 7–8—A1170 Addition to 1-6601/ITA (35:65 wt) Formulation

In experiments 7–8 the (1-6601/A1170):ITA formulations were utilized in a weight ratio of 35:65 wt with a total solids content of 20%. The solvents employed in all the experiments described below were common industrial grade isopropanol and distilled water. The 1-6601 was obtained from Dow Corning Corporation (Midland, Mich.), the Silquest A 1170 from Witco and the itaconic acid from Aldrich Chemical Company (Milwaukee, Wis.). The formulation was applied to the primary film web (48 gauge DuPont Mylar LBT2) by means of a reverse gravure cylinder. The solvent Experiments 9–10—A1170 Addition to 1-6601/ITA (40:60 wt) Formulation In experiments 9–10 the (1-6601/A1170):ITA formulations were utilized in a weight ratio of 40:60 wt with a total solids content of 20%. The solvents employed in all the experiments described below were common industrial grade isopropanol and distilled water. The 1-6601 was obtained from Dow Corning Corporation (Midland, Mich.), the Silquest A1170 from Witco and the itaconic acid from Aldrich Chemical Company (Milwaukee, Wis.). The formulation was applied to the primary film web (48 gauge DuPont Mylar LBT2) by means of a reverse gravure cylinder. The solvent was flashed off by passing the web through an oven maintained at 82° C. and the coated film was laminated to the secondary web (200 gauge Huntsman LLDPE 800.14) using a heated laminating nip (71° C., 190PLI). The laminate was next "cured" by an EB machine at 10 Megarads and 115 Kv.

Experiment 9—No A1170

Water (2 Kg) was added to a solution of 1-6601 (869 g) and IPA (1.48 Kg) and the mixture stirred for 10 minutes. Itaconic acid (586.4 g) was added to the solution and the mixture was stirred for 2 hours. This was coated using a $90^{TH}$ gravure roll operating at 110% of the line speed which was set at 0.31 m/s. After coating, drying, laminating and curing, the permeability was determined to be 1.5 cc dry and 116 cc wet and the adhesive layer thickness was determined to be 2.2 μm.

Experiment 10—20% A1170

1-6601 (438.7 g), IPA (822 g) were stirred together for 10 mins. Water (2 Kg) and ITA (447.5 g) were added to the above mentioned mixture and this was stirred for 15 mins. 1.32 Kg of Part C was added to the mixture and this was stirred for 2 hours (where Part C was made by mixing 1.5 Kg A1170, 7.4 Kg IPA and 1.1 Kg ITA together). This was coated using a $90^{TH}$ gravure roll operating at 110% of the line speed which was set at 0.31 m/s. After coating, drying, laminating and curing, the permeability was determined to be 0.3 cc dry and 78 cc wet and the adhesive layer thickness was determined to be 1.7 μm.

The barrier data is shown in Table 5 and adhesive/water resistance data is shown in Table 6.

TABLE 5

| Expt. # | Material 1-6601:A1170:ITA Ratio | OTR1 90% RH cc/m²/day | OTR 0% RH cc/m²/day | Adhesive Thickness μm | OTR$_{predicted}$ 2 3 μm adhesive 90% RH cc/m²/day | OTR$_{predicted}$ 3 3 μm adhesive 0% RH cc/m²/day |
|---|---|---|---|---|---|---|
| 9 | 40:0:60 | 116 | 1.5 | 2.2 | 113.6 | 1.10 |
| 10 | 20:20:60 | 78 | 0.3 | 1.7 | 60.9 | 0.17 |

TABLE 6

| Expt. # | Material 1-6601:A1170:ITA Ratio | Adhesive Property | Time of observation after start of test min | | | | |
|---|---|---|---|---|---|---|---|
| | | | 45 | 90 | 210 | 1110 | 1260 |
| 9 | 40:0:60 | + | tunneling | — | — | — | — |
| 10 | 20:20:60 | + | good | good | good | good | good |

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A method of laminating comprising:

(I) coating at least one side of a first substrate with a laminating adhesive, (II) bringing the coated side of the substrate into contact with a second substrate to form a multi-layer film, and (III) treating the multi-layer film with a free radical initiator, the laminating adhesive being made by mixing an ethylenically unsaturated acid, a bis-silane, and a polyamine optionally having a crosslinker reacted therein, wherein the polyamine has four or more A, B, or C units, where:

A is an —$R^2$—$N(R^1)_2$ unit, B is an —$R^1$—$N(R^2$—$)_2$ unit, and C is an (—$R^2)_3N$— unit, in which $R^1$ is independently selected from the group consisting of hydrogen, alkyl, substituted alkyl, aryl, substituted aryl, arylalkyl, and alkylaryl, and $R^2$ is independently selected from the group consisting of linear, branched, and substituted alkylene groups having from 1 to 18 carbon atoms, and arylene groups and substituted arylene groups having from 6 to 18 carbon atoms; and the bis-silane has the formula:

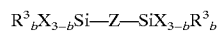

in which Z is $R^4NH(R^4NH)_pR^4$; each $R^3$ is a hydrocarbon group, each X is an alkoxy group with 1 to 4 carbon atoms, a halogen atom, an oxime group or an acyloxy group, each $R^4$ is a divalent hydrocarbon group having 1 to 12 carbon atoms; b is from 0 to 3, and p is 0 or 1.

2. The method of claim 1 wherein the equivalents ratio of nitrogen atoms on the polyamine to the silicon atoms on the bis-silane to the acid groups on the ethylenically unsaturated acid is from 10:1:1 to 1:10:1 to 1:1:100.

3. The method of claim 1 wherein the laminating adhesive is dissolved in a solvent and the solvent is selected from the group consisting of water, alcohol, ether derivatives of mono and polyglycols, and mixtures thereof, and the solvent constitutes 5–95 parts by weight of the total composition.

4. The method of claim 1 wherein the ethylenically unsaturated acid is selected from the group consisting of itaconic, fumaric, maleic, citraconic, acrylic, methacrylic, and cinnamic, itaconic acid monomethylester, vinylphosphonic acid, mesaconic acid, sorbic acid, and vinyl sulphonic acid, and mixtures thereof.

5. The method of claim 1 wherein said bis-silane is bis-(g-trimethoxysilylpropyl)amine.

6. The method of claim 1 wherein said bis-silane is (bis-[(3-trimethoxysilyl)propyl ethylenediamine).

7. The product made by the method of claim 6.

8. The method of claim 1 wherein the polyamine is polyethylene imine.

9. The method of claim 8 wherein the polyethylene imine has a molecular weight in the range of 600 to 25,000.

10. The method of claim 8 wherein the molar ratio of nitrogen atoms on the polyamine to the acid groups on the ethylenically unsaturated acid is from 10:1 to 1:100.

11. The method of claim 8 wherein the substrate is selected from the group consisting of polyolefins; oriented polypropylene; cast polypropylene; polyethylene and polyethylene copolymer; polystyrene; polyesters; polyethylene terephthalate; polyethylene naphthalate; polyolefin copolymers; ethylene vinyl acetate; ethylene acrylic acid; ethylene vinyl alcohol; polyvinyl alcohol and copolymers thereof; polyamides, nylon; meta-xylene adipamide (MXD6); polyimides; polyacrylonitrile; polyvinyl chloride; polyvinyl dichloride; polyvinylidene chloride; polyacrylates; ionomers; polysaccharides; regenerated cellulose; silicone; rubbers or sealants; natural or synthetic rubbers; glassine or clay coated paper; paper board; craft paper; metallized films; and vapor deposited metal oxide coated polymer films.

12. The method of claim 11 wherein the laminating adhesive is disposed on one or more additional substrates to form a laminate, and said additional substrate or substrates are optionally primed.

13. The method of claim 11 wherein the substrate is primed.

14. The method of claim 11 wherein the multi-layer film of step (III) is heated in the presence of moisture.

15. The product made by the method of claim 14.

16. The method of claim 8 wherein said bis-silane is bis-(g-trimethoxysilylpropyl)amine.

17. The method of claim 8 wherein said bis-silane is (bis-[(3-trimethoxysilyl)propyl]ethylenediamine).

18. The method of claim 1 wherein the crosslinker is present and is a reactive silane having the general formula $QSiR_m(OR)_{3-m}$ where Q contains a group selected from the group consisting of: acrylates, aldehydes, methacrylates, acrylamides, methacrylamides, isocyanates, isothiocyanate, anhydrides, epoxides, acid chlorides, linear or branched halogenated alkyl, and halogenated aryl, and m is 1, 2 or 3, and R is a group having 1 to 4 carbon atoms, and said composition has optionally been neutralized.

19. The method of claim 1 wherein a free radical reaction is initiated by electron beam radiation, gamma radiation or ultraviolet radiation, optionally in the presence of photoinitiators, or a free radical reaction is initiated thermally in the presence of a free radical generator.

20. The method of claim 19 wherein the multi-layer film of step (III) is cured by electron beam radiation at from 5 KeV to 2000 KeV and greater than 0.1 Mrads.

21. The method of claim 19 wherein the multi-layer film of step (III) is cured by electron beam radiation at 150 kV and at least 5 Mrads.

22. The method of claim 1 wherein the multi-layer film of step (III) is heated.

23. The method of claim 1 wherein the crosslinker is present and is an organic crosslinker.

24. The method of claim 1 wherein the substrate of step (I) is primed.

25. The method of claim 24 herein the primer is selected from the group consisting of a silane, polyethylene imine, and carbodiimide.

26. The method of claim 1 wherein the multi-layer film of step (III) is disposed on one or more additional substrates to form a laminate, and said additional substrate or substrates are optionally primed.

27. The method of claim 26 wherein the additional substrates used to form the laminate are selected from the group consisting of polyolefins; oriented polypropylene; cast polypropylene; polyethylene and polyethylene copolymer; polystyrene; polyesters; polyethylene terephthalate; polyethylene naphthalate; polyolefin copolymers; ethylene vinyl acetate; ethylene acrylic acid; ethylene vinyl alcohol; polyvinyl alcohol and copolymers thereof; polyamides, nylon; and meta-xylene adipamide (MXD6); polyimides; polyacrylonitrile; polyvinyl chloride; polyvinyl dichloride; polyvinylidene chloride; polyacrylates; ionomers; polysaccharides; regenerated cellulose; silicone; rubbers or sealants; natural or synthetic rubbers; glassine or clay coated paper; paper board; craft paper; metallized films; and vapor deposited metal oxide coated polymer films.

28. A packaging container the improvement comprising a multi-layer film integral therewith, the multi-layer film formed by the method of claim 1.

29. The packaging container of claim 28 wherein the package is selected from the group consisting of a pouch, tube, vial, bottle, bag-in-box, stand-up pouch, gable top carton, thermoformed tray, brick-pack, box, and cigarette pack.

30. The product made by the method of claim 1 wherein the first substrate is polyethylene and the second substrate is metallized oriented polyethylene.

31. The product made by the method of claim 1 wherein the first substrate is oriented polypropylene and the second substrate is oriented-polypropylene.

32. The product made by the method of claim 1 wherein the first substrate is oriented polypropylene and the second substrate is polyethylene.

33. The product made by the method of claim 1 wherein the first substrate is metallized oriented polypropylene and the second substrate is oriented polypropylene.

34. The product made by the method of claim 1 wherein the first substrate is oriented polyethylene terephthalate, and the second substrate is polyethylene.

35. The product made by the method of claim 1 wherein the first substrate is metallized oriented polyethylene terephthalate and the second substrate is polyethylene.

36. The product made by the method of claim 1 wherein the first substrate is metal oxide coated polyethylene terephthalate, and the second substrate is polyethylene.

37. The product made by the method of claim 1 wherein the first substrate is metal oxide coated polyethylene terephthalate, and the second substrate is polypropylene.

38. The product made by the method of claim 1 wherein the first substrate is metal oxide coated oriented polypropylene and the second substrate is polyethylene.

39. The product made by the method of claim 1 wherein the first substrate is metal oxide coated oriented polypropylene, and the second substrate is polypropylene.

40. The product made by the method of claim 1 wherein the first substrate is polyethylene and the second substrate is polyethylene.

* * * * *